Figure 1:
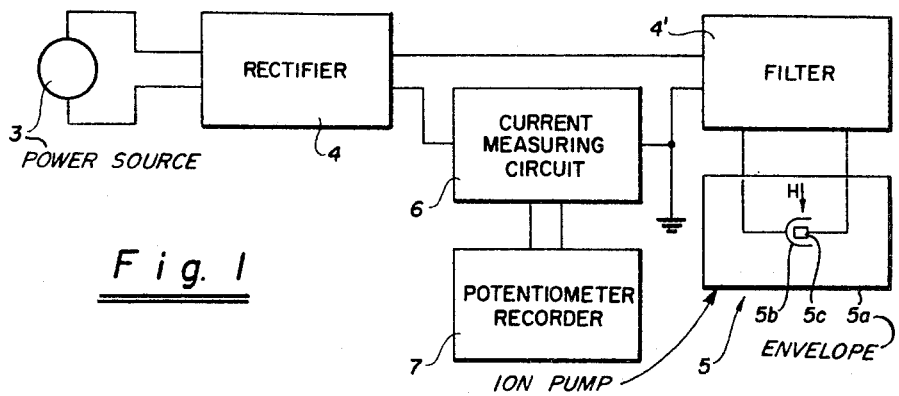

Aug. 16, 1966 H. A. MANDOLI ETAL 3,267,377
MEASURING CIRCUIT FOR PROVIDING AN OUTPUT EITHER LINEARLY OR
LOGARITHMICALLY RELATED TO AN INPUT
Original Filed June 1, 1959

INVENTOR.
Harry A. Mandoli
Robert J. Rorden
BY
Paul B. Hunter
Attorney

# United States Patent Office 3,267,377
Patented August 16, 1966

3,267,377
MEASURING CIRCUIT FOR PROVIDING AN OUTPUT EITHER LINEARLY OR LOGARITHMICALLY RELATED TO AN INPUT
Harry A. Mandoli and Robert J. Rorden, Palo Alto, Calif., assignors to Varian Associates, Palo Alto, Calif., a corporation of California
Original application June 1, 1959, Ser. No. 817,344, now Patent No. 3,118,103, dated Jan. 14, 1964. Divided and this application Nov. 1, 1961, Ser. No. 149,318
3 Claims. (Cl. 324—115)

This application is a divisional application of U.S. patent application Serial No. 817,344, filed June 1, 1959 now U.S. Patent 3,118,103, issued January 14, 1964.

The present invention relates to a power supply with a compressed scale measuring circuit especially adapted to supply power to a load that varies over a wide range of resistance.

In many circumstances it is desirable to supply power to a load which varies over a wide range of resistance and to measure and automatically record the electrical current supplied to the load.

In the past, current supplied to such a load has been measured over several ranges by providing means for switching between ranges. However, range switching is not only costly but quite cumbersome under circumstances in which frequent range switching is necessary. Furthermore, since the corect range cannot always be predicted, it is necessary to determine the proper range by trial and error. Also, when a chart recording is being made over a decade at a time, a full picture of the reaction of the variable load is not available and it is not apparent over which range the recording was made unless each chart is individually marked.

An example of typical loads that vary over a wide range of resistance are ion vacuum pumps such as the glow discharge getter ion high vacuum pump sold under the trademark VacIon" by Varian Associates. The resistance of these ion vacuum pumps varies approximately inversely with the pressure within the system which the pump is evacuating, and the current drawn by the pump will typically vary over a wide range such as, for example, from one microampere to 200 milliamperes for a glow discharge getter ion vacuum pump pumping room air at five liters per second. Such a glow discharge getter ion vacuum pump pumps over a range of $10^{-3}$ to $10^{-10}$ mm. of Hg. Also, at relatively high pressure within the ion vacuum pump, as encountered during starting of the pump, the current drawn therethrough may be large resulting in excessive power dissipation within the pump which may result in damaging internal parts thereof.

The primary object of the present invention is to provide a novel power supply with a compressed scale measuring circuit to supply and measure the current drawn by a load over a wide range.

One feature of the present invention is the provision of a novel power supply with a compressed scale current measuring circuit which gives an approximately logarithmic response in a meter and a recording device provided therefor.

Another feature of the present invention is the provision of a novel power supply with means for delivering a first current for establishing an ion current, means for measuring said first current and means for making said means for measuring said first current more sensitive to changes in said current.

Another feature of the present invention is the provision of a novel power supply with a compressed scale current measuring circuit provided with means for changing the measuring circuit whereby small changes in current flow can be observed.

Still another feature of the present invention is the provision of a novel power supply for an ion vacuum pump, the novel power supply including a compressed scale current measuring circuit which also measures the vacuum produced by the vacuum pump and means for changing the measuring circuit whereby small changes in current flow can be observed for leak detecting.

Figure 2:
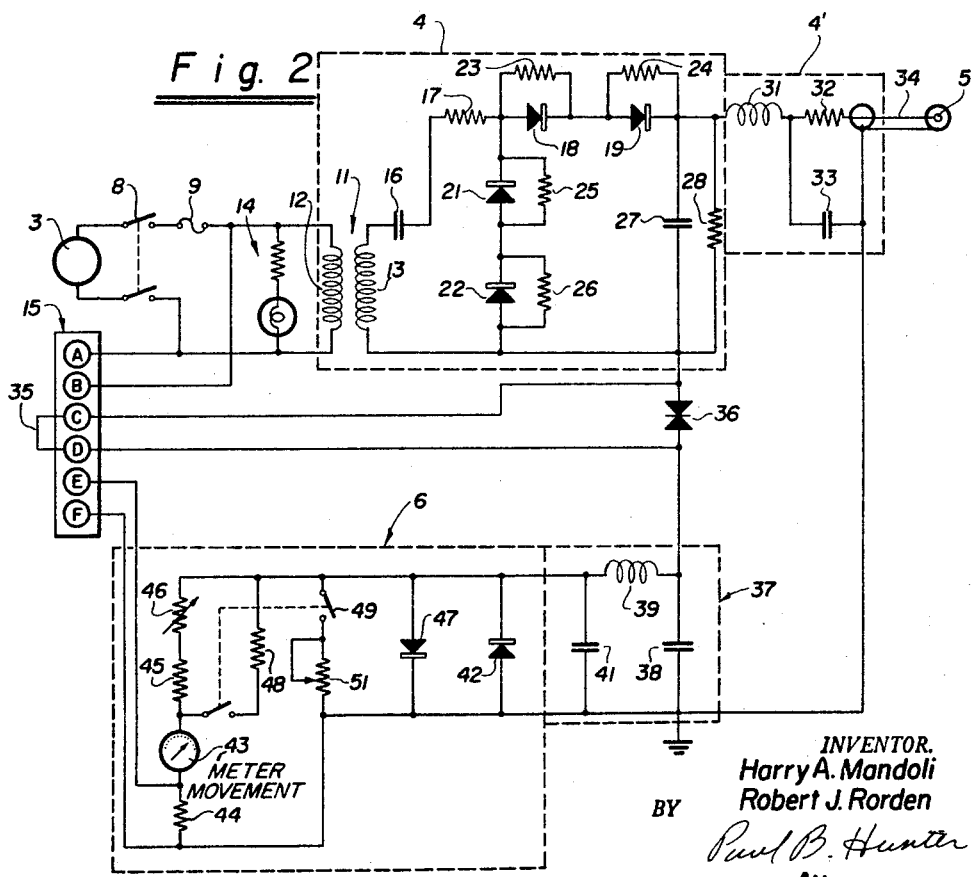

These and other features and advantages of the present invention will be more apparent after a perusal of the following specification taken in connection with the accompanying drawing wherein, FIG. 1 is a block diagram of the components of the novel power supply, and FIG. 2 is a circuit diagram of the novel power supply.

The novel power supply of the present invention can be used with any load which varies over a wide range of resistance and is especially adapted for use with an ion vacuum pump since the current drawn by such a pump bears a direct relation to the vacuum created in the system in which the pump is operated. The current drawn by such a vacuum pump varying, for example, from less than one microampere to 200 milliamperes could not ordinarily be measured without considerable range switching.

Referring now to FIG. 1 of the drawing, a power source as, for example, a 60 cycle generator 3 delivers power to a rectifier 4 which, in turn, supplies current to the load 5 through filter 4'. The load illustrated here is a glow discharge getter ion high vacuum pump which comprises a vacuum tight envelope 5a, a cathode 5b within the envelope for atomization by ion bombardment for pumping matter in the gaseous state and an anode electrode 5c within said envelope for establishing a glow discharge over the cathode. A magnetic field H is directed between the cathode 5b and the anode 5c to increase ionization. With the current through the load returned to ground, a current measuring circuit 6 is connected between the rectifier 4 and ground to measure the current delivered to the load 5. The current registered in the current measuring circuit 6 can be preserved by, for example, a potentiometer recorder 7.

In detail, (see FIG. 2) 60 cycle A.C. current is delivered from the generator 3 through a double pole switch 8, through a fuse 9 to a magnetic core transformer 11 comprising a primary winding 12 and a secondary winding 13 for converting the generator power to the appropriate voltage as, for example, 1–10 kv. for the load. Current is returned from the primary winding 12 to the double pole switch 8 and back to generator 3. A pilot light 14 is shunted with the primary winding 12 of transformer 11 to indicate when the power supply is operating. Switches and fused power from generator 3 is available in a junction box 15 by connecting the two sides of switch 8 to terminals A and B of the junction box for the purpose of interlocking other equipment or controlling power to auxiliary equipment such as a recorder connected to these terminals.

Rectifier 4 is, for example, a cascade doubler rectifier and includes capacitors 16 and 27, resistors 17, 23, 24, 25, 26 and 28 and diodes 18, 19, 21 and 22.

For the characteristics of transformer 11 in a cascade doubler rectifier, the A.C. open circuit voltage in the secondary winding 13 can be chosen from the desired open circuit D.C. output voltage to the load using the formula $$V_{sec.} = \frac{V_{oc}}{2\sqrt{2}}$$

where $V_{sec}$ is the R.M.S. secondary open circuit A.C. voltage and $V_{oc}$ is the secondary open circuit D.C. output voltage that is double the peak secondary A.C. voltage. With the desired maximum output D.C. short circuit current from rectifier 4 designated as $I_{sc}$ the R.M.S. current $I_{sec}$ in the secondary winding 13 can be determined from the formula $$I_{sec.}=\frac{\pi}{\sqrt{2}}I_{sc}$$

which takes into consideration the fact that current only flows during one half of each complete cycle of applied voltage.

Typical values of voltage and current desirable for a glow discharge getter ion vacuum pump are 2500 volts open circuit voltage and 180 milliamperes short circuit current.

In rectifier 4, the capacitor 16, a current limiting capacitor, is connected in series with the secondary winding 13 of transformer 11 and delivers current through the resistor 17 to the central tap of a diode string in which all the diodes are series connected to conduct current in the same direction. Thus, diodes 18 and 19 in the diodes string on one side of the central tap are arranged to conduct current from the transformer through capacitor 16 to the load, and diodes 21 and 22 on the other side of the central tap of the diode string are arranged to conduct current from the diode string through capacitor 16 toward the transformer 11. The capacitor, of course, need not necessarily be positioned between the secondary winding 13 and the central tap of the diode string so long as it is effectively in series with the power source and so that it can serve to double the voltage applied to rectifier 4.

The current limiting capacitor 16 serves a dual function. It serves to limit short circuit current through the rectifier 4 to a predetermined value and also serves as an active element of rectifier 4 to double the voltage applied to rectifier 4 when current flows through the rectifier.

The reactance of the capacitor 16 results in a voltage drop when current is drawn from the supply. By deliberately selecting a small capacitance for capacitor 16, a high capacitive reactance is provided in series with rectifier 4 thereby limiting short circuit current to a desired value. The capacitance C of capacitor 16 can be found from the formula $$\frac{1}{2\pi fC}=\frac{V_{sec.}}{I_{sec.}}$$

where $V_{sec}$ and $I_{sec}$ are the R.M.S. A.C. voltage and current in the secondary and $f$ is the generator frequency. Thus, a capacitor used as the current limiting capacitor must be rated to withstand an R.M.S. A.C. voltage $V_{sec}$ and to withstand a peak voltage of $\sqrt{2}\ V_{sec}$. From the formulate stated above for the cascade doubler rectifier here illustrated, C can be found from the formula $$\frac{1}{2\pi fC}=\frac{V_{oo}}{2\pi I_{sc}}$$

or in simplified form $$C=\frac{I_{sc}}{fV_{oo}}$$

For the typical values of voltage and current stated above for a glow discharge getter ion vacuum pump the capacitace of capacitor C would be approximately 0.95 microfarad whereas the capacitance of the usual capacitor that is used in a rectifier to double the voltage is made quite large as, for example, about 10 microfarads in a circuit as illustrated here, in order to conduct as much power as possible from the power source to the load.

Since the capacitor 16 is a nearly lossless device, very little power is dissipated in the supply, and the supply can withstand operation into a short circuit without overheating. The capacitor 16 can be used as a current limiting device when placed in series with the power source for any other rectifier as, for example, a voltage doubler rectifier or a bridge type rectifier.

The resistance 17 is placed in series with the capacitor 16 to limit switching transient currents to a value which cannot damage the diodes of the cascade doubler rectifier under the worst conditions and resistors 23, 24, 25 and 26 are shunted across diodes 18, 19, 21 and 22, respectively, to equalize reverse voltage drops in each half of the series diode string. Each half of the diodes string is designed to withstand a peak inverse voltage equal to the output D.C. voltage, and a D.C. current equal to the output short-circuit current. The use of two diodes in each half of the diode string is purely an illustration to indicate that more than one diode may be necessary in each half of the string. One or several diodes may be necessary to achieve the desired results under different operating conditions. A filter capacitor 27 connecting the ends of the diode string in rectifier 4 delivers D.C. power from the forward end of the diode string to the load 5 and serves to smooth out the amplitude of the half wave rectification of rectifier 4. The backward end of the diode string is connected to ground as described below and to the secondary winding 13 of transformer 11. A bleeder resistor 28 is shunted across capacitor 27 to discharge the rectifier capacitors when the power supply is turned off.

The filter 4' between the rectifier 4 and the load 5 blocks radio frequency currents which may be generated in the load thereby preventing damage to the diodes in rectifier 4 and comprises an inductor 31 and a resistor 32 in series with the forward end of the diode string in rectifier 4 and a capacitor 33 shunted across resistor 32 and the load 5. Current is carried from this filter 4' to the load 5 and returned by means of a coaxial cable 34 and coax plug 5', and the return current is connected to ground.

The current delivered to the load is measured between the rectifier 4 and ground. The line from the backward end of the diode string to ground is carried to a terminal C and thence from a terminal D in the junction box 15 to ground through the current measuring circuit 6, terminals C and D providing means to which an external meter or relay may be connected. Since these terminals are in series with the supply, they must be shorted by a jumper 35 when no external meter or relay is used. An open circuit at terminals C and D may result in high voltages at these terminals, and therefore to protect operating personnel under these conditions, a high voltage protective cut out 36 is provided in the power supply between the lines connected to terminals C and D. This protective cutout 36 contains a thin copper oxide film which breaks down at high voltage as, for example 200 volts thereby preventing higher voltages from appearing at terminals C and D. The cutout 36 is positioned in the power supply so as to be easily replaceable.

A low pass filter 37 included in the measuring circuit 6 removes A.C. components from the D.C. current flowing through the measuring circuit 6. This filter 37 comprises a capacitor 38 in the line connecting rectifier 4 to ground and an inductor 39 in series with a capacitor 41 both of which are shunted across the capacitor 38.

The current measuring circuit 6 covers a range of, for example, 200,000 to 1 measuring from one microampere to 200 milliamperes for the glow discharge getter ion vacuum pump power supply here illustrated. A measuring diode 42 as, for example, a silicon junction diode is shunted across filter capacitor 41 so as to cause the current to be measured to pass through diode 42 in the forward direction. This diode 42 is chosen to match a specific voltage-current curve whereby the voltage across this diode is approximately proportional to the logarithm of the diode current ($V\alpha\log I$). Any other type of diode such as a vacuum tube or germanium semiconductor can be used, but the characteristics of a silicon junction diode are especially appropriate for the range from one microampere to 200 milliamperes.

A meter movement 43 in series with resistors 44, 45 and 46 is shunted across measuring diode 42 and forms a voltmeter which measures the voltage across the measuring diode 42 thereby giving a logarithmic indication of current through the load 5 in the high current range. At low current levels, as, for example, about ten microamperes for the ion vacuum pump power supply illustrated here, the current through the voltmeter circuit becomes larger than the current through the measuring diode 42, and the system becomes nearly a linear device. Calibration of the meter is arranged to allow for this. The face of meter movement 43 is calibrated both in current and pressure.

Resistor 46 is variable to allow a calibration adjustment for meter movement 43 when the power supply is first used. The resistor 44 is used to deliver a voltage proportional to the meter movement deflection to terminals E and F of the junction box 15 to which a potentiometer type recorder can be connected. The chart paper of the potentiometer recorder can be calibrated in a similar manner as is the face of meter movement 43 to record both current and pressure.

A diode 47 is shunted across measuring diode 42 and is biased in the reverse direction from diode 42 to protect the meter movement 43 from "kick" caused by stored energy in the filter 37 when the current is suddenly interrupted. Thus, when the current is interrupted, inductor 39 causes current to flow into capacitor 38 resulting in a positive charge on capacitor 38. Current then flows back through inductor 39 and a positive charge appears at capacitor 41. This voltage appears across the meter movement 43 driving it in the reverse direction. The diode 47 diverts most of this current, thereby preventing damage to the meter movement. The measuring diode 42 is biased in the reverse direction to the current flow at this time, and negligible current flows through it.

The accuracy of this system is inherently limited by the compressed scale and the sensitivity of the measuring diode to temperature. However, temperature effects can be greatly reduced by placing the measuring diode 42 in a controlled oven and by individual calibration of the meter movement and recorder scales to match the characteristics of the measuring diode 42. However, the accuracy in the previously described embodiment of the present invention is sacrificed to make its components interchangeable and to keep the system simple and reliable.

The compression of five decades into a single scale makes the present system relatively insensitive to small changes in current. For some purposes such as leak detecting, it is desirable to be able to see small changes in current, even though the absolute value of current or pressure is of no great importance. This is facilitated by the use of double-pole switch 49 which simultaneously switches resistor 48 in parallel with resistors 45 and 46 and the variable resistor 51 in parallel with the measuring diode 42. The resistance of the voltmeter system is thereby lowered, and the variable resistor 51 is adjustable at the front panel of the supply and can be adjusted to bring the pointer of the meter movement 43 to some convenient mark near full scale. Because of the reduced resistance of the voltmeter circuit and because of the placement of the variable resistor 51 in parallel with the diode 42, the voltage across the measuring diode 42 is so small the current through the diode is negligible. The current measuring system is now a linear current meter with an arbitrary adjustable scale and small changes in the current drawn by the ion pump are readily observed. Thus, when a test gas such as oxygen is applied to the leak and the pumping speed of the ion pump for this test gas differs from the pumping speed of the ion pump for the air that is leaking into the system being pumped, the change in the current drawn by the ion pump indicates the presence of a leak. Here the measuring diode 42 acts as a meter protector by diverting current if the variable resistor 51 is improperly adjusted, and the current through the meter movement 43 is limited to approximately twice the full scale value under the worst conditions.

Approximate values for the elements of a power supply for a glow discharge getter ion vacuum pump as described above are given in the following table:

| Element: | | Value |
|---|---|---|
| 14 | | 82Ω |
| 16 | μf | 0.95 |
| 17 | | 40Ω |
| 23+24 | | 390KΩ |
| 25+26 | | 390KΩ |
| 27 | μf | 0.5 |
| 28 | | 3MΩ |
| 31 | mh | 1 |
| 32 | | 150Ω |
| 33 | μf | .002 |
| 38 | μf | 100 |
| 39 | h | 1.0 |
| 41 | μf | 80 |
| 44 | | 2.5KΩ |
| 45 | | 30KΩ |
| 46 | | 5KΩ |
| 48 | | 39KΩ |
| 51 | | 100KΩ |

Using the novel power supply with an ion vacuum pump and a recorder several important advantages of continuous recording of many decades of current and pressure without bothersome and often confusing range switching are realized. All pressure leaks are recorded. Entire pump-down cycles may be recorded unattended, both in the laboratory and on the production line. Asymptotic levels of pressure can be readily recognized.

Although specially adapted for use with the power supply for an ion vacuum pump, the measuring circuit described above is equally useful in any system or device for giving an approximate measurement of current over an extremely wide range. It can be used in alternating current systems as well as direct current systems by providing two measuring diodes in parallel biased in opposite directions for conducting current on each half cycle of the alternating current with an alternating current meter to measure the current through these diodes.

Since many changes could be made in the above construction and many apparently widely different embodiments of this invention could be made without departing from the scope thereof it is intended that all matter contained in the above description or shown in the accompanying drawings shall be interpreted as illustrative and not in a limiting sense.

What is claimed is:

1. A current measuring circuit for providing an output quantity either logarithmically or linearly related to an input current comprising, in combination: input means; a first diode the voltage across which varies approximately as the logarithm of the current therethrough connected across said input means; a voltmeter circuit including meter movement and voltmeter circuit resistance connected in parallel with said first diode; impedance means; a variable impedance for shunting across said first diode; and, switching means for connecting said impedance means in circuit connection with said voltmeter circuit to reduce the resistance of said voltmeter circuit and for shunting said variable impedance across said first diode.

2. The current measuring circuit of claim 1 wherein said switching means connects said impedance means in shunt with the voltmeter circuit resistance.

3. The current measuring circuit of claim 1 wherein said voltmeter circuit includes a resistance made up of a plurality of resistors one of which is provided with terminals for connecting a recorder in shunting relation thereto.

(References on following page)

References Cited by the Examiner

UNITED STATES PATENTS

| | | | |
|---|---|---|---|
| 2,571,458 | 10/1951 | Lawrence et al. | 324—132 |
| 2,576,330 | 11/1951 | Beringer | 324—33 |
| 2,874,354 | 2/1959 | Bell | 324—115 |
| 2,947,465 | 8/1960 | Otavka | 230—69 |
| 2,981,888 | 4/1961 | White | 324—115 |
| 3,004,220 | 10/1961 | Williamson | 324—119 X |
| 3,016,488 | 1/1962 | Smith et al. | 324—115 |
| 3,058,057 | 10/1962 | Frost | 324—33 |

WALTER L. CARLSON, *Primary Examiner.*

FREDERICK M. STRADER, *Examiner.*

J. P. O'BRIEN, C. F. ROBERTS, J. J. MULROONEY,
*Assistant Examiners.*